United States Patent
Gopalan

(10) Patent No.: US 9,276,788 B2
(45) Date of Patent: Mar. 1, 2016

(54) JOINT DEMODULATING AND DEMAPPING OF DIGITAL SIGNAL

(71) Applicant: QUALCOMM Incorporated, San Diego, CA (US)

(72) Inventor: RaviKiran Gopalan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/576,511

(22) Filed: Dec. 19, 2014

(65) Prior Publication Data

US 2015/0358188 A1 Dec. 10, 2015

Related U.S. Application Data

(60) Provisional application No. 62/009,796, filed on Jun. 9, 2014.

(51) Int. Cl.
*H04L 27/14* (2006.01)
*H04W 4/00* (2009.01)

(52) U.S. Cl.
CPC .............. *H04L 27/14* (2013.01); *H04W 4/008* (2013.01)

(58) Field of Classification Search
CPC .............. H04L 1/005; H04L 25/03178; H04L 27/2331; H04L 1/0054; H04L 1/04; H04L 27/38; H04L 27/14; H04W 4/008
See application file for complete search history.

(56) References Cited

U.S. PATENT DOCUMENTS

| | | | |
|---|---|---|---|
| 7,535,972 B2 | 5/2009 | Hammerschmidt et al. |
| 7,920,637 B2 | 4/2011 | Fonseka et al. |
| 8,223,820 B2 | 7/2012 | Rouxel |
| 2011/0142156 A1 | 6/2011 | Haartsen |
| 2011/0142173 A1 | 6/2011 | Peng et al. |
| 2013/0195229 A1 | 8/2013 | Cheng et al. |
| 2014/0062588 A1 | 3/2014 | Gopalan et al. |

OTHER PUBLICATIONS

International Search Report and Written Opinion—PCT/US2015/029235—ISA/EPO—Aug. 27, 2015.
Vikalo H., et al., "On joint ml detection and decoding for linear block codes", Proceedings 2003 IEEE International Symposium on Information Theory. ISIT 03. Yokohama, Japan, Jun. 29-Jul. 4, 2003; [IEEE International Symposium on Information Theory], New York, NY: IEEE, US, Jun. 29, 2003, pp. 275-275, XP010657303, ISBN: 978-0-7803-7728-8.

*Primary Examiner* — Vineeta Panwalkar
(74) *Attorney, Agent, or Firm* — Muncy, Geissler, Olds & Lowe, P.C.

(57) ABSTRACT

A method of joint demodulating and demapping of a digital signal includes receiving a first sequence of the digital signal. The digital signal has a pattern in which a norm of an ideal transmitted sequence of symbols for zero is equal to a norm of an ideal transmitted sequence of symbols for one. The method also includes defining a portion of the first sequence as a third sequence, determining, for each element of a set of the third sequence, one of a real part of a value or an imaginary part of the value of the element, calculating a value for a combination of the determined one of the real part of the value or the imaginary part of the value for the each element of the set, and setting a bit equal to one in response to the value for the combination being less than zero.

30 Claims, 7 Drawing Sheets

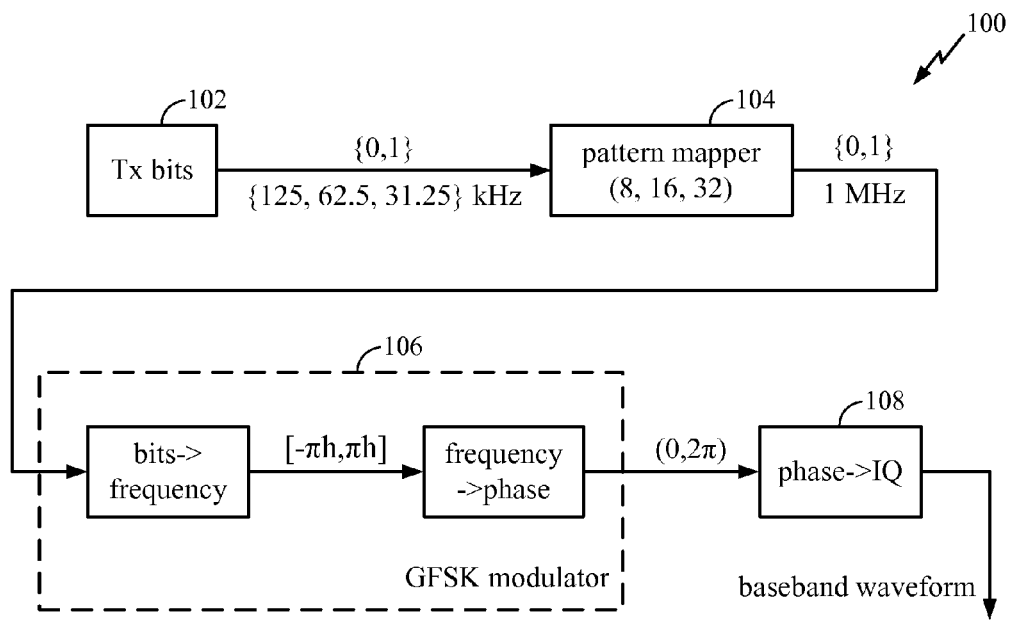
CONVENTIONAL
FIG. 1
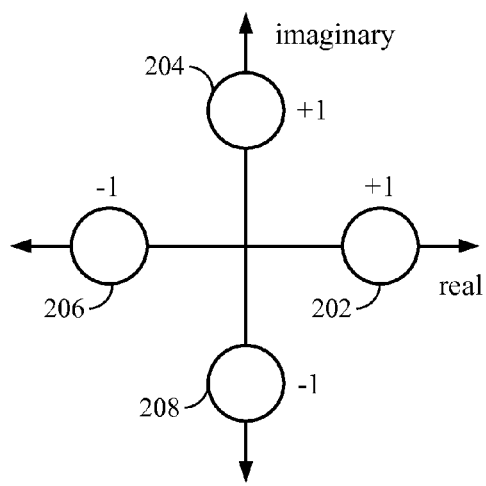
CONVENTIONAL
FIG. 2

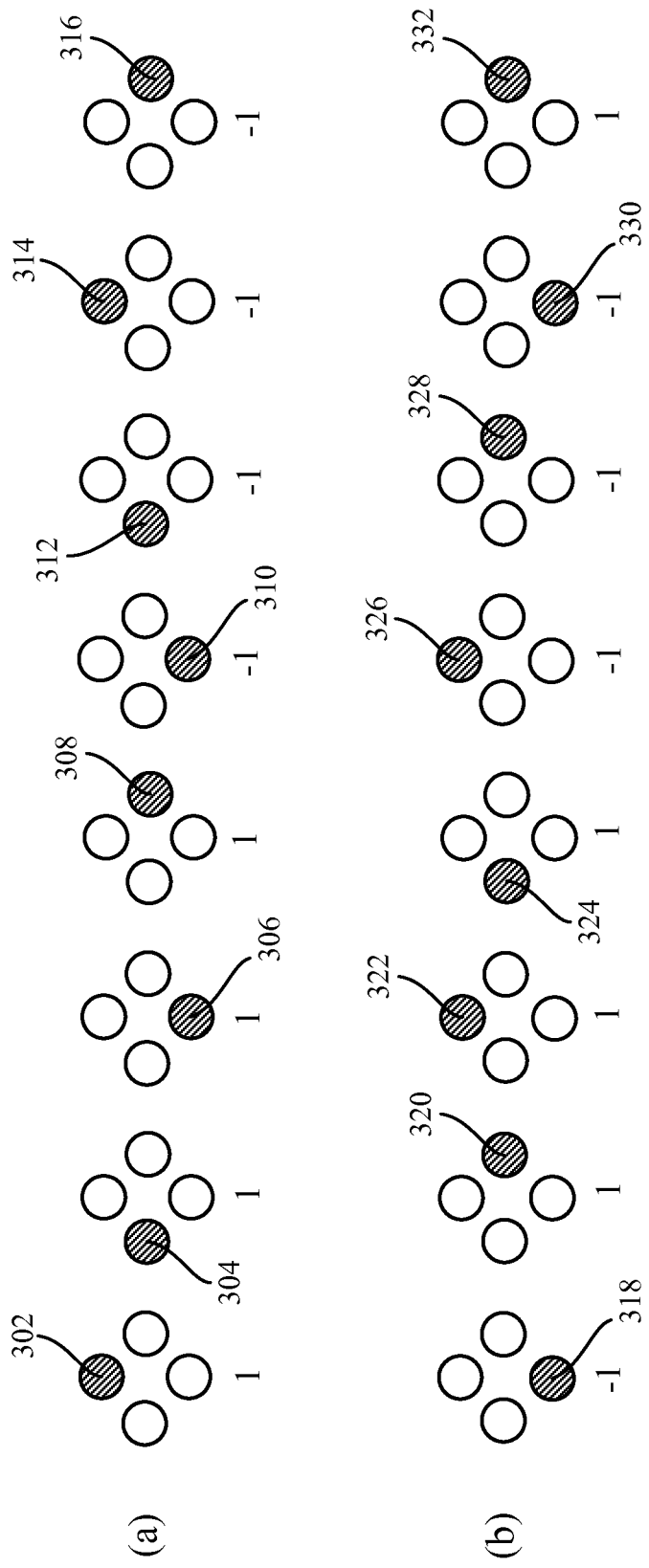
CONVENTIONAL
FIG. 3

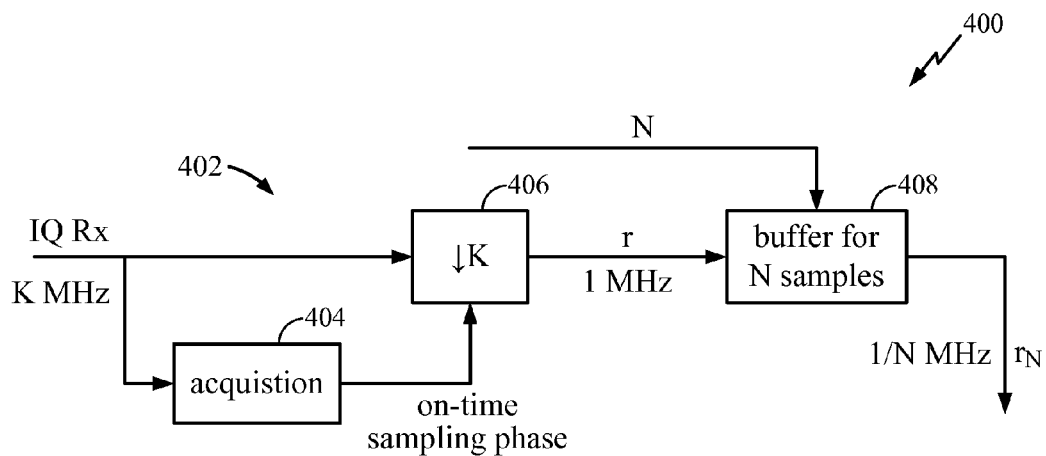
CONVENTIONAL
FIG. 4

JOINT DEMODULATING AND DEMAPPING OF DIGITAL SIGNAL

CROSS-REFERENCE TO RELATED APPLICATIONS

The present Application for Patent claims the benefit under 35 U.S.C. §119(e) of U.S. Provisional Application No. 62/009,796, entitled "Joint Demodulating and Demapping of Digital Signal," filed Jun. 9, 2014.

INTRODUCTION

1. Field

Aspects disclosed herein relate generally to joint demodulating and demapping of a digital signal, and particularly to joint demodulating and demapping of a digital signal configured to meet specifications of Bluetooth® Core.

2. Description of the Related Art

Wireless personal area network technologies take advantage of radio frequencies allocated for low power communications to enable the establishment of short-range wireless networks that interconnect devices within the personal space of a user. Through such interconnections a user can operate a peripheral component of a personal computing system without the need for wired connections between the personal computer and the peripheral component. Additionally, such interconnections facilitate the ability to connect a first device to a larger area network, including the Internet, by establishing a personal area network between the first device and a second device and connecting the second device to the larger area network.

Bluetooth® low energy (or Bluetooth® LE) is a recently developed wireless personal area network technology. As compared with the original Bluetooth® technology, Bluetooth® LE technology is directed to reducing power consumption while maintaining a similar range of communications. The specification requirements of the Bluetooth® LE technology originally were incorporated by the Bluetooth® Special Interest Group into the Bluetooth® Core Version 4.0 specification, which was adopted on Jun. 30, 2010. Several addenda and a supplement to the Core Version 4.0 specification have been adopted since its introduction, most recently the Core Specification Supplement (CSS) v4, which was adopted on Dec. 3, 2013. Also on Dec. 3, 2013, the Special Interest Group adopted the Bluetooth® Core Version 4.1 specification, which includes the requirements of the original Core Version 4.0 specification, its addenda and supplement, and adds new feature and benefits.

SUMMARY

A received digital signal (r) can comprise a series of first sequences. The first sequence can have a first length equal to a modulation efficiency (N) (e.g., 8, 16, 24, 32, etc.). The first sequence can have a pattern ($p_i$). The pattern ($p_i$) can be based on a second sequence. The second sequence can have a second length (e.g., 8). The first length (e.g., 8, 16, 24, 32, etc.) can be a multiple of the second length (e.g., 8) so that the pattern ($p_i$) in the first sequence repeats the second sequence according to the multiple.

Prior to transmission, each original bit in a bit stream $\{0, 1\}$ can be mapped into the first sequence of bits based on the pattern ($p_i$) so that there is a first first sequence for an original bit value of zero and a second first sequence for an original bit value of one. The first first sequence can be IQ modulated to produce an ideal transmitted sequence of symbols for zero ($S_0$) and the second first sequence can be IQ modulated to produce an ideal transmitted sequence of symbols for one ($S_1$). However, during transmission a value of an individual bit in the first sequence of bits (p) can change due to noise, interference, distortion, or any combination of these such that the value of the individual bit in the first sequence of bits in the received digital signal (r) can be different from the value of the individual bit in the first sequence of bits (p) produced prior to transmission. Therefore, a receiver system must implement a decision rule to determine a true value of the original bit from the first sequence of bits in the received digital signal (r).

When a norm of an ideal transmitted sequence of symbols for zero ($S_0$) is equal to a norm of an ideal transmitted sequence of symbols for one ($S_1$), the decision rule to determine the true value of the original bit from the first sequence of bits in the received digital signal (r) can be simplified not to require calculations performed on each bit in the first sequence of bits in the received digital signal (r), but rather perform calculations only on a set of a third sequence. The third sequence can be a portion of the first sequence. (The third sequence corresponds to the second sequence, which is the basis of the pattern ($p_i$).) The set can be a portion of the third sequence (e.g., the calculations can exclude at least one element from the third sequence.)

Features and utilities of aspects disclosed herein can be achieved by providing a method of joint demodulating and demapping of a digital signal that can include receiving a first sequence of the digital signal (r). The first sequence can have a first length equal to a modulation efficiency (N). The first sequence can have a pattern ($p_i$) in which a norm of an ideal transmitted sequence of symbols for zero ($S_0$) is equal to a norm of an ideal transmitted sequence of symbols for one ($S_1$). The pattern ($p_i$) can be based on a second sequence that has a second length. The first length can be a multiple of the second length. The method can also include defining at least a portion of the first sequence as a third sequence. The third sequence can have the second length. The method can also include determining, for each element of a set, one of a real part of a value of the element or an imaginary part of the value of the element. The set can be at least a portion of the third sequence. The method can also include calculating a value for a combination of the determined one of the real part of the value or the imaginary part of the value for the each element of the set, setting a bit equal to one in response to the value for the combination being less than zero, and setting the bit equal to zero in response to the value for the combination being equal to or greater than zero.

Features and utilities of aspects disclosed herein can also be achieved by providing a joint demodulator and demapper for a digital signal that can include an input port, a memory, a first circuit, a second circuit, a third circuit, and an output port. The input port can be configured to receive a first sequence of the digital signal (r). The first sequence can have a first length equal to a modulation efficiency (N). The first sequence can have a pattern ($p_i$) in which a norm of an ideal transmitted sequence of symbols for zero ($S_0$) is equal to a norm of an ideal transmitted sequence of symbols for one ($S_1$). The pattern ($p_i$) can be based on a second sequence having a second length. The first length can be a multiple of the second length. The memory can be configured to store the first sequence. The first circuit can be configured to determine, for each element of a set, one of a real part of a value of the element or an imaginary part of the value of the element. The set can be at least a portion of a third sequence. The third sequence can be at least a portion of the first sequence. The third sequence can have the second length. The second circuit can be configured to calculate a value for a combination of the one of the real part of the value or the imaginary part of the value determined for the each element of the set. The third circuit can be configured to set a bit equal to one in response to the value for the combination being less than zero and to set the bit equal to zero in response to the value for the combination being equal to or greater than zero. The output port can be configured to transmit the bit.

Features and utilities of aspects disclosed herein can also be achieved by providing a joint demodulator and demapper for a digital signal that can include means for receiving a first sequence of the digital signal (r). The first sequence can have a first length equal to a modulation efficiency (N). The first sequence can have a pattern ($p_i$) in which a norm of an ideal transmitted sequence of symbols for zero ($S_0$) is equal to a norm of an ideal transmitted sequence of symbols for one ($S_1$). The pattern ($p_i$) can be based on a second sequence that has a second length. The first length can be a multiple of the second length. The demodulator and demapper can also include means for defining at least a portion of the first sequence as a third sequence. The third sequence can have the second length. The demodulator and demapper can also include means for determining, for each element of a set, one of a real part of a value of the element or an imaginary part of the value of the element. The set can be at least a portion of the third sequence. The demodulator and demapper can also include means for calculating a value for a combination of the one of the real part of the value or the imaginary part of the value determined for the each element of the set, means for setting a bit equal to one in response to the value for the combination being less than zero, and means for setting the bit equal to zero in response to the value for the combination being equal to or greater than zero.

Features and utilities of aspects disclosed herein can also be achieved by providing a non-transitory computer-readable recording medium for joint demodulation and demapping of a digital signal in which the non-transitory computer-readable recording medium can include at least one instruction to cause an electronic processor to receive a first sequence of the digital signal (r). The first sequence can have a first length equal to a modulation efficiency (N). The first sequence can have a pattern ($p_i$) in which a norm of an ideal transmitted sequence of symbols for zero ($S_0$) is equal to a norm of an ideal transmitted sequence of symbols for one ($S_1$). The pattern ($p_i$) can be based on a second sequence that has a second length. The first length can be a multiple of the second length. The non-transitory computer-readable recording medium can also include at least one instruction to cause the electronic processor to define at least a portion of the first sequence as a third sequence. The third sequence can have the second length. The non-transitory computer-readable recording medium can also include at least one instruction to cause the electronic processor to determine, for each element of a set, one of a real part of a value of the element or an imaginary part of the value of the element. The set can be at least a portion of the third sequence. The non-transitory computer-readable recording medium can also include at least one instruction to cause the electronic processor to calculate a value for a combination of the determined one of the real part of the value or the imaginary part of the value for the each element of the set, set a bit equal to one in response to the value for the combination being less than zero, and set the bit equal to zero in response to the value for the combination being equal to or greater than zero.

BRIEF DESCRIPTION OF THE DRAWINGS

A more complete appreciation of implementations of the aspects disclosed herein and many of the attendant advantages thereof will be readily obtained as the same becomes better understood by reference to the following detailed description when considered in connection with the accompanying drawings which are presented solely for illustration and not limitation of the aspects disclosed herein, and in which:

FIG. 1 is a block diagram of an example of a Bluetooth® LE Long Range transmission system.

FIG. 2 is a diagram of an example of a symbol produced by the IQ modulator illustrated in FIG. 1.

FIG. 3 includes diagrams of ideal sequences of symbols produced by the IQ modulator illustrated in FIG. 1 that correspond to the sequences of bits produced by the pattern mapper illustrated in FIG. 1.

FIG. 4 is a block diagram of a first portion of an example of a Bluetooth® LE Long Range receiver system.

DETAILED DESCRIPTION

Figure 5:
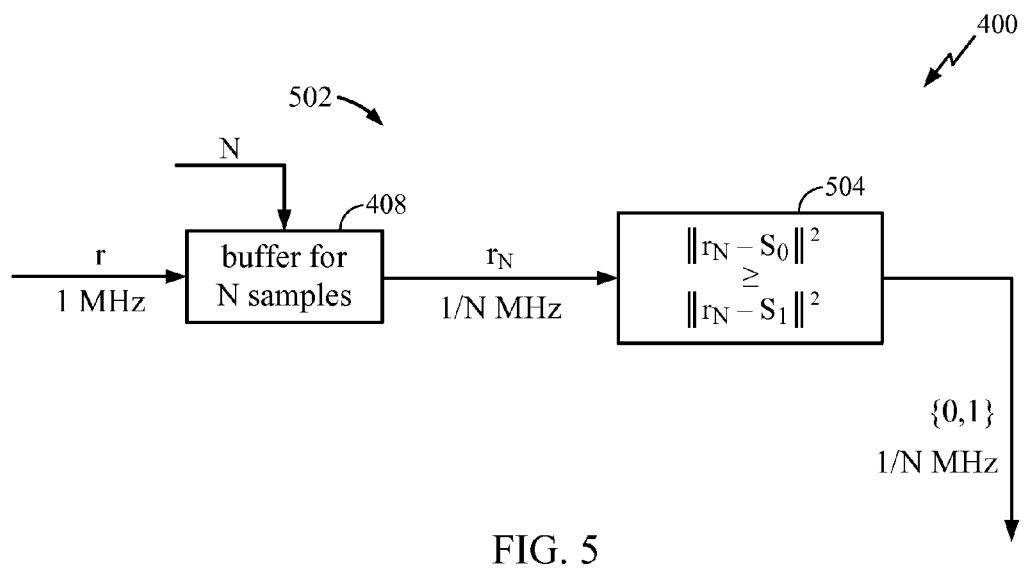
FIG. 5 is a block diagram of a second portion of the example of the Bluetooth® LE Long Range receiver system.

Aspects disclosed in the following description and related drawings directed to specific implementations. Alternate implementations may be devised without departing from the scope of the aspects. Additionally, well-known elements of the aspects disclosed herein are not described in detail or are omitted so as not to obscure the relevant details.

The words "exemplary" and/or "example" are used herein to mean "serving as an example, instance, or illustration." Any implementation described herein as "exemplary" and/or "example" is not necessarily to be construed as preferred or advantageous over other implementations.

Further, many implementations are described in terms of sequences of actions to be performed by, for example, elements of a computing device. One of skill in the art recognizes that various actions described herein can be performed by specific circuits (e.g., application specific integrated circuits (ASICs)), by program instructions being executed by one or more electronic processors, or by a combination of both. Additionally, these sequence of actions described herein can be considered to be embodied entirely within any form of computer-readable recording medium having stored therein a corresponding set of instructions, which when executed by an associated electronic processor, cause the associated processor to perform the functionality described herein. Thus, various aspects can be embodied in a number of different forms, all of which have been contemplated to be within the scope of the claimed subject matter. In addition, for each of the implementations described herein, the corresponding form of any such implementation can be described herein as, for example, "logic configured to" perform the described action.

Bluetooth® low energy (or Bluetooth® LE) is a recently developed wireless personal area network technology. As compared with the original Bluetooth® technology, Bluetooth® LE technology is directed to reducing power consumption while maintaining a similar range of communications. Additionally, within the development of Bluetooth® LE technology there is an effort to improve the sensitivity. This effort is known as Long Range LE. The actual sensitivity level can be defined as that receiver input level for which a bit error rate (BER) of 0.1% is achieved.

A Bluetooth® LE radio can have a transmitter, a receiver, or both. A frequency hopping transceiver can be used to combat interference and fading. Bluetooth® LE devices operate in the unlicensed 2.4 GHz band designated for industrial, scientific, and medical (ISM) purposes, particularly in the range from 2400 to 2483.5 MHz. The Bluetooth® LE system uses forty radio frequency channels. These radio frequency channels have center frequencies given by the expression: 2402 +(k*2 MHz), where k=0, . . . , 39. A Bluetooth® LE signal is modulated using Gaussian Frequency Shift Keying (GFSK) with a bandwidth bit period product (BT) equal to 0.5. The modulation index can be between 0.45 and 0.55. A binary one can be represented by a positive frequency deviation, and a binary zero can be represented by a negative frequency deviation.

Each Bluetooth® LE packet can include four fields: a preamble, an Access Address, a Protocol Data Unit (PDU), and a Cyclic Redundancy Check (CRC). These fields can be arranged in a Bluetooth® LE packet from the least significant bit (LSB) to the most significant bit (MSB) as follows: the preamble (1 octet), the Access Address (4 octets), the Protocol Data Unit (2-39 octets), and the Cyclic Redundancy Check (3 octets).

FIG. 1 is a block diagram of an example of a Bluetooth® LE Long Range transmission system 100. The transmission system 100 can include a transmitter 102, a pattern mapper 104, a Gaussian Frequency Shift Key modulator 106, and an IQ modulator 108. The transmitter 102 can be configured to transmit a bit stream {0, 1} at any of a variety of frequencies. For example, as illustrated in FIG. 1, the transmitter 102 can transmit the bit stream {0, 1} at any of 125 kHz, 93.75 kHz, 62.5 kHz, or 31.25 kHz. The pattern mapper 104 can be configured to receive the bit stream {0, 1} from the transmitter 102 and to produce a bit stream {0, 1} at a specific frequency. For example, as illustrated in FIG. 1, the pattern mapper 104 can produce the bit stream {0, 1} at 1 MHz.

The relationship between the frequency at which the pattern mapper 104 can produce the bit stream {0, 1} (e.g., 1 MHz) and the frequency at which the transmitter 102 can transmit the bit stream {0, 1} (e.g., 125 kHz, 93.75 kHz, 62.5 kHz, or 31.25 kHz) can be defined by a modulation efficiency (N), which can be used by the pattern mapper 104 and by a Bluetooth® LE Long Range receiver system 400 (described below). For example, if the transmitter 102 can transmit the bit stream {0, 1} at 125 kHz, then the modulation efficiency (N) is 8, if the transmitter 102 can transmit the bit stream {0, 1} at 62.5 kHz, then the modulation efficiency (N) is 16, if the transmitter 102 can transmit the bit stream {0, 1} at 93.75 kHz, then the modulation efficiency (N) is 24, and if the transmitter 102 can transmit the bit stream {0, 1} at 31.25 kHz, then the modulation efficiency (N) is 32.

The Gaussian Frequency Shift Key modulator 106 can be configured to receive the bit stream {0, 1} at 1 MHz from the pattern mapper 104 and to produce a modulated phase stream (0, 2π). The IQ modulator 108 can be configured to receive the modulated phase stream (0, 2π) and to produce a baseband waveform that is modulated to have an in-phase (I) component and a quadrature (Q) component.

The pattern mapper 104 can improve the sensitivity of a Bluetooth® LE Long Range system by mapping each bit in the bit stream {0, 1} into a sequence of bits (p). The length of the sequence of bits (p) is the modulation efficiency (N). For example, if the modulation efficiency (N) is equal to 8, then the pattern mapper 104 can map each bit in the bit stream {0, 1} into a sequence of 8 bits, if the modulation efficiency (N) is equal to 16, then the pattern mapper 104 can map each bit in the bit stream {0, 1} into a sequence of 16 bits, if the modulation efficiency (N) is equal to 24, then the pattern mapper 104 can map each bit in the bit stream {0, 1} into a sequence of 24 bits, and if the modulation efficiency (N) is equal to 32, then the pattern mapper 104 can map each bit in the bit stream {0, 1} into a sequence of 32 bits.

Having each bit in the bit stream {0, 1} mapped into a sequence of bits (p) can improve sensitivity because having each bit in the bit stream {0, 1} represented as the sequence of bits (p) increases the likelihood that the true value of the bit mapped by the pattern mapper 104 can be determined from the sequence of bits (r) at the Bluetooth® LE Long Range receiver system 400 because, in aggregate and due to the redundancy inherent in the sequence of bits (p), the values of the individual bits in the sequence of bits (r) can be sufficiently close to the true value of the bit mapped by the pattern mapper 104 that the Bluetooth® LE Long Range receiver system 400 can determine that the value of the individual bit is equal to the true value of the bit mapped by the pattern mapper 104.

Moreover, it has been determined that, for a modulation efficiency (N) equal to 8, The following sequence of bits (p) are likely to be recoverable despite the effects of noise, interference, and distortion during transmission:

for an original bit value of one, $p_1 = \{-1, 1, 1, 1, -1, -1, -1, 1\}$ and for an original bit value of zero, $p_0 = \{1, 1, 1, 1, -1, -1, -1, -1\}$.

Additionally, for a modulation efficiency (N) equal to a value that is a multiple of 8, the sequence of bits (p) that is likely to be recoverable despite the effects of noise, interference, and distortion during transmission repeats the sequence of bits (p) used for a modulation efficiency (N) equal to 8. For example, for a modulation efficiency (N) equal to 16, the following sequence of bits (p) are likely to be recoverable despite the effects of noise, interference, and distortion during transmission:

for an original bit value of one, $p_1 = \{-1, 1, 1, 1, -1, -1, -1, 1, -1, 1, 1, 1, -1, -1, -1, 1\}$ and for an original bit value of zero, $p_0 = \{1, 1, 1, 1, -1, -1, -1, -1, 1, 1, 1, 1, -1, -1, -1, -1\}$.

Likewise, for each of a modulation efficiency (N) equal to another multiple of 8 (e.g., 24, 32, etc.), the sequence of bits (p) that corresponds to such modulation efficiency (N) similarly repeats the sequence of bits (p) used for the modulation efficiency (N) equal to 8 and implementations are not limited to the specific sequences presented above.

FIG. 2 is a diagram of an example of a symbol (S) produced by the IQ modulator 108 illustrated in FIG. 1. The symbol (S) is depicted as an IQ value that can be represented by a complex number on a Cartesian coordinate system in which the abscissa represents a real part (Re) of the IQ value and the ordinate represents an imaginary part (Im) of the IQ value. The symbol (S) can be determined by the IQ value. For example, a position 202 on the diagram corresponds to an IQ value having only a real part value of +1, a position 204 on the diagram corresponds to an IQ value having only an imaginary part value of +1, a position 206 on the diagram corresponds to an IQ value having only a real part value of −1, and a position 208 on the diagram corresponds to an IQ value having only an imaginary part value of −1.

FIG. 3 includes diagrams of ideal sequences of symbols (S) produced by the IQ modulator 108 illustrated in FIG. 1 that correspond to the sequences of bits (p) produced by the pattern mapper 106 illustrated in FIG. 1. A view (a) of FIG. 3 is a diagram of an ideal sequence of symbols ($S_0$) produced by the by the IQ modulator 108 illustrated in FIG. 1 that corresponds to the sequence of bits ($p_0$) produced by the pattern mapper 106 illustrated in FIG. 1 for an original bit value of zero. In view (a) of FIG. 3, a first element $p_{0,0}$ corresponds to a first element $S_{0,0}$ 302 in which the IQ value is only an imaginary part with the value +1, a second element $p_{0,1}$ corresponds to a second element $S_{0,1}$ 304 in which the IQ value is only a real part with the value −1, a third element $p_{0,2}$ corresponds to a third element $S_{0,2}$ 306 in which the IQ value is only an imaginary part with the value −1, a fourth element $p_{0,3}$ corresponds to a fourth element $S_{0,3}$ 308 in which IQ value is only a real part with the value +1, a fifth element $p_{0,4}$ corresponds to a fifth element $S_{0,4}$ 310 in which the IQ value is only an imaginary part with the value −1, a sixth element $p_{0,5}$ corresponds to a sixth element $S_{0,5}$ 312 in which the IQ value is only a real part with the value −1, a seventh element $p_{0,6}$ corresponds to a seventh element $S_{0,6}$ 314 in which the IQ value is only an imaginary part with the value +1, and an eighth element $p_{0,7}$ corresponds to an eighth element $S_{0,7}$ 316 in which the IQ value is only a real part with the value +1.

A view (b) of FIG. 3 is a diagram of an ideal sequence of symbols ($S_1$) produced by the by the IQ modulator 108 illustrated in FIG. 1 that corresponds to the sequence of bits ($p_1$) produced by the pattern mapper 106 illustrated in FIG. 1 for an original bit value of one. In view (b) of FIG. 3, a first element $p_{1,0}$ corresponds to a first element $S_{1,0}$ 318 in which the IQ value is only an imaginary part with the value −1, a second element $p_{1,1}$ corresponds to a second element $S_{1,1}$ 320 in which the IQ value is only a real part with the value +1, a third element $p_{1,2}$ corresponds to a third element $S_{1,2}$ 322 in which the IQ value is only an imaginary part with the value +1, a fourth element $p_{1,3}$ corresponds to a fourth element $S_{1,3}$ 324 in which the IQ value is only a real part with the value −1, a fifth element $p_{1,4}$ corresponds to a fifth element $S_{1,4}$ 326 in which the IQ value is only an imaginary part with the value +1, a sixth element $p_{1,5}$ corresponds to a sixth element $S_{1,5}$ 328 in which the IQ value is only a real part with the value +1, a seventh element $p_{1,6}$ corresponds to a seventh element $S_{1,6}$ 330 in which the IQ value is only an imaginary part with the value −1, and an eighth element $p_{1,7}$ corresponds to an eighth element $S_{1,7}$ 332 in which the IQ value is only a real part with the value +1.

Because for a modulation efficiency (N) equal to a value that is a multiple of 8, the sequence of bits (p) that is likely to be recoverable despite the effects of noise, interference, and distortion during transmission repeats the sequence of bits (p) used for a modulation efficiency (N) equal to 8, the ideal sequences of symbols (S) used for a modulation efficiency (N) equal to a value that is a multiple of 8 likewise repeats the ideal sequences of symbols (S) used for a modulation efficiency (N) equal to 8.

FIG. 4 is a block diagram of a first portion 402 of an example of a Bluetooth® LE Long Range receiver system 400. The receiver system 400 can include an acquisition block 404, a decimator 406, and a buffer 408. The acquisition block 404 can be configured to receive the IQ modulated waveform at a front end frequency of "k" MHz, to determine an on-time sampling phase needed to down convert the IQ modulated waveform at the front end frequency of "k" MHz to the specific bit rate of the pattern mapper 104 (e.g., 1 MHz), and to transmit the on-time sampling phase to the decimator 406. The decimator 406 can be configured to receive the IQ modulated waveform at the front end frequency of "k" MHz, to receive the on-time sampling phase from the acquisition block 404, and to down convert the IQ modulated waveform to the specific bit rate of the pattern mapper 104 (e.g., 1 MHz). The buffer 408 can be configured to receive the modulation index (N) used by the Bluetooth® LE Long Range transmission system 200, to receive the down converted IQ modulated waveform (r) from the decimator 406, and to produce an IQ modulated waveform at the frequency produced by the transmitter 102 (e.g., 125 kHz, 93.75 kHz, 62.5 kHz, or 31.25 kHz) ($r_N$).

FIG. 5 is a block diagram of a second portion 502 of the example of the Bluetooth® LE Long Range receiver system 400. The receiver system 400 can further include a joint demodulator and demapper 504. The joint demodulator and demapper 504 can be configured to receive, from the buffer 408, the IQ modulated waveform at the frequency produced by the transmitter 102 (e.g., 125 kHz, 93.75 kHz, 62.5 kHz, or 31.25 kHz) ($r_N$) and to produce a received bit stream {0, 1} at the frequency produced by the transmitter 102 (e.g., 125 kHz, 93.75 kHz, 62.5 kHz, or 31.25 kHz). It is important to note that because the waveform ($r_N$) is IQ modulated, values of the sequence of bits ($r_N$) are represented as complex numbers.

As explained above, because the value of an individual bit in the sequence of bits (p) can change during transmission due to noise, interference, distortion, or any combination of these such that the value of an individual bit in the sequence of bits (r) received at the Bluetooth® LE Long Range receiver system 400 is different from the value of the individual bit in the sequence of bits (p) produced by the pattern mapper 104, the joint demodulator and demapper 504 can be configured to determine the true value of the bit mapped by the pattern mapper 104 from the sequence of bits (r) by implementing a decision rule in which the Euclidean distance between the sequence of bits (r) and the ideal transmitted sequence of symbols for zero ($S_0$) ($\|r-S_0\|^2$) is compared with the Euclidean distance between the sequence of bits (r) and the ideal transmitted sequence of symbols for one ($S_1$) ($\|r-S_1\|^2$).

If the Euclidean distance between the sequence of bits (r) and the ideal transmitted sequence of symbols for zero ($S_0$) ($\|r-S_0\|^2$) is greater than or equal to the Euclidean distance between the sequence of bits (r) and the ideal transmitted sequence of symbols for one ($S_1$) ($\|r-S_1 81\ ^2$), which is indicative that the value of the sequence of the bits (r) is closer to one than to zero, then the joint demodulator and demapper 504 can determine that the true value of the bit mapped by the pattern mapper 104 is one and can set the value of that bit in the received bit stream {0, 1} to one. Conversely, if the Euclidean distance between the sequence of bits (r) and the ideal transmitted sequence of symbols for zero ($S_0$) ($\|r-S_0\|^2$) is less than the Euclidean distance between the sequence of bits (r) and the ideal transmitted sequence of symbols for one ($S_1$) ($\|r-S_1\|^2$), which is indicative that the value of the sequence of the bits (r) is closer to zero than to one, then the joint demodulator and demapper 504 can determine that the true value of the bit mapped by the pattern mapper 104 is zero and can set the value of that bit in the received bit stream {0, 1} to zero.

However, because the norm of the ideal transmitted sequence of symbols for zero ($S_0$) ($\|S_0\|^2$) is equal to the norm of the ideal transmitted sequence of symbols for one ($S_1$) ($\|S_1\|^2$), the joint demodulator and demapper 504 can be replaced by a joint demodulator and demapper configured to perform operations according to the aspects disclosed herein.

The decision rule, in its original form, is:

$$\|r\|^2 + \|S_0\|^2 \geq \|r - S_1\|^2.$$

By expansion, this expression is equal to:

$$\|r\|^2 + \|S_0\|^2 - 2Re\{rS_0\} \geq \|r\|^2 + \|S_1\|^2 - 2Re\{rS_1\}.$$

Because $\|S_0\|^2 = \|S_1\|^2$, this expression simplifies to:

$$-2Re\{rS_0\} \geq -2Re\{rS_1\}.$$

Dividing both sides of this expression by $-2$ yields:

$$Re\{rS_0\} < Re\{rS_1\}.$$

Applying the associative law of addition yields:

$$Re\{r(S_0 - S_1)\} < 0.$$

Accordingly, the decision rule depends upon $(S_0 - S_1)$.

Referring to FIG. 3, which includes diagrams of ideal sequences of symbols (S) that have lengths equal to a modulation efficiency (N) of 8, the first element $S_{1,0}$ 318 corresponds to an IQ value with only an imaginary part with the value $-1$. Subtracting the first element $S_{1,0}$ 318 from the first element $S_{0,0}$ 302, which corresponds to an IQ value with only an imaginary part with the value $+1$, produces a difference that corresponds to an IQ value with only an imaginary part with the value $+2$.

The second element $S_{1,1}$ 320 corresponds to an IQ value with only a real part with the value $+1$. Subtracting the second element $S_{1,1}$ 320 from the second element $S_{0,1}$ 304, which corresponds to an IQ value with only a real part with the value $-1$, produces a difference that corresponds to an IQ value with only a real part with the value $-2$.

The third element $S_{1,2}$ 322 corresponds to an IQ value with only an imaginary part with the value $+1$. Subtracting the third element $S_{1,2}$ 322 from the third element $S_{0,2}$ 306, which corresponds to an IQ value with only an imaginary part with the value $-1$, produces a difference that corresponds to an IQ value with only an imaginary part with the value $-2$.

The fourth element $S_{1,3}$ 324 corresponds to an IQ value with only a real part with the value $-1$. Subtracting the fourth element $S_{1,3}$ 324 from the fourth element $S_{0,3}$ 308, which corresponds to an IQ value only a real part with the value $+1$, produces a difference that corresponds to an IQ value with only a real part with the value $+2$.

The fifth element $S_{1,4}$ 326 corresponds to an IQ value with only an imaginary part with the value $+1$. Subtracting the fifth element $S_{1,4}$ 326 from the fifth element $S_{0,4}$ 310, which corresponds to an IQ value with only an imaginary part with the value $-1$, produces a difference that corresponds to an IQ value with only an imaginary part with the value $-2$.

The sixth element $S_{1,5}$ 328 corresponds to an IQ value with only a real part with the value $+1$. Subtracting the sixth element $S_{1,5}$ 328 from the sixth element $S_{0,5}$ 312, which corresponds to an IQ value with only a real part with the value $-1$, produces a difference that corresponds to an IQ value with only a real part with the value $-2$.

The seventh element $S_{1,6}$ 330 corresponds to an IQ value with only an imaginary part with the value $-1$. Subtracting the seventh element $S_{1,6}$ 330 from the seventh element $S_{0,6}$ 314, which corresponds to an IQ value with only an imaginary part with the value $+1$, produces a difference that corresponds to an IQ value with an imaginary part with the value $+2$.

The eighth element $S_{1,7}$ 332 corresponds to an IQ value with a real part with the value $+1$. Subtracting the eighth element $S_{1,7}$ 332 from the eighth element $S_{0,7}$ 316, which corresponds to an IQ value with a real part with the value $+1$, produces a difference that corresponds to an IQ value a real part with the value 0.

Accordingly, $(S_0 - S_1) = \{+2j, -2, -2j, +2, -2j, -2, +2j, 0\}$.

Substituting these values of $(S_0 - S_i)$ into the decision rule, $Re\{r(S_0 - S_1)\} < 0$, yields:

$$Re\{+2jr_0, -2r_1, -2jr_2, +2r_3, -2jr_4, -2r_5, +2jr_6, 0r_7\} < 0.$$

Dividing both sides of this expression by 2 yields:

$$Re\{+jr_0, -r_1, -jr_2, +r_3, -jr_4, -r_5, +jr_6, 0r_7\} < 0.$$

Note that the real part (Re) of each element in the sequence that is multiplied by a value of $j$ in the sequence (i.e., $+j$ or $-j$) is obtained by multiplying the imaginary part (Im) of that element (which also includes a $j$) by the value of $j$ in the sequence. The real part (Re) of each element in the sequence that is not multiplied by a value of $j$ in the sequence (i.e., $+j$ or $-j$) is obtained from the real part (Re) of that element.

Thus, the decision rule becomes:

$$Im\{r_0\} - Re\{r_1\} + Im\{r_2\} + Re\{r_3\} + Im\{r_4\} - Re\{r_5\} - Im\{r_6\} < 0.$$

Note that because the eighth element of the sequence $(r_7)$ is multiplied by zero, the eighth element of the sequence $(r_7)$ can be removed from the expression for the decision rule.

Advantageously, because for a modulation efficiency (N) equal to a value that is a multiple of 8, the ideal sequences of symbols (S) repeats the ideal sequences of symbols (S) used for a modulation efficiency (N) equal to 8, the decision rule for a sequence of bits (r) that has a length equal to a multiple of 8 can generally be expressed with reference to elements from a sequence of bits (r) that has a length equal to 8 that is within the sequence of bits (r) that has the length equal to the multiple of 8. For example, the decision rule for the sequence of bits $\{r_0, r_1, r_2, r_3, r_4, r_5, r_6, r_7, r_8, r_9, r_{10}, r_{11}, r_{12}, r_{13}, r_{14}, r_{15}\}$ can be expressed with reference to the elements from the sequence $\{r_0, r_1, r_2, r_3, r_4, r_5, r_6, r_7\}$. More specifically, the decision rule can be expressed with reference to the elements from a set that can be at least a portion of the sequence of bits (r) that has the length equal to 8 that is within the sequence of bits (r) that has the length equal to the multiple of 8. For example, the decision rule for the sequence of bits $\{r_0, r_1, r_2, r_3, r_4, r_5, r_6, r_7, r_8, r_9, r_{10}, r_{11}, r_{12}, r_{13}, r_{14}, r_{15}\}$ can be expressed with reference to the elements from the set $\{r_0, r_1, r_2, r_3, r_4, r_5, r_6\}$ that is a portion of the sequence $\{r_0, r_1, r_2, r_3, r_4, r_5, r_6, r_7\}$ (e.g., the set excludes the eighth element of the sequence $(r_7)$).

Figure 6:
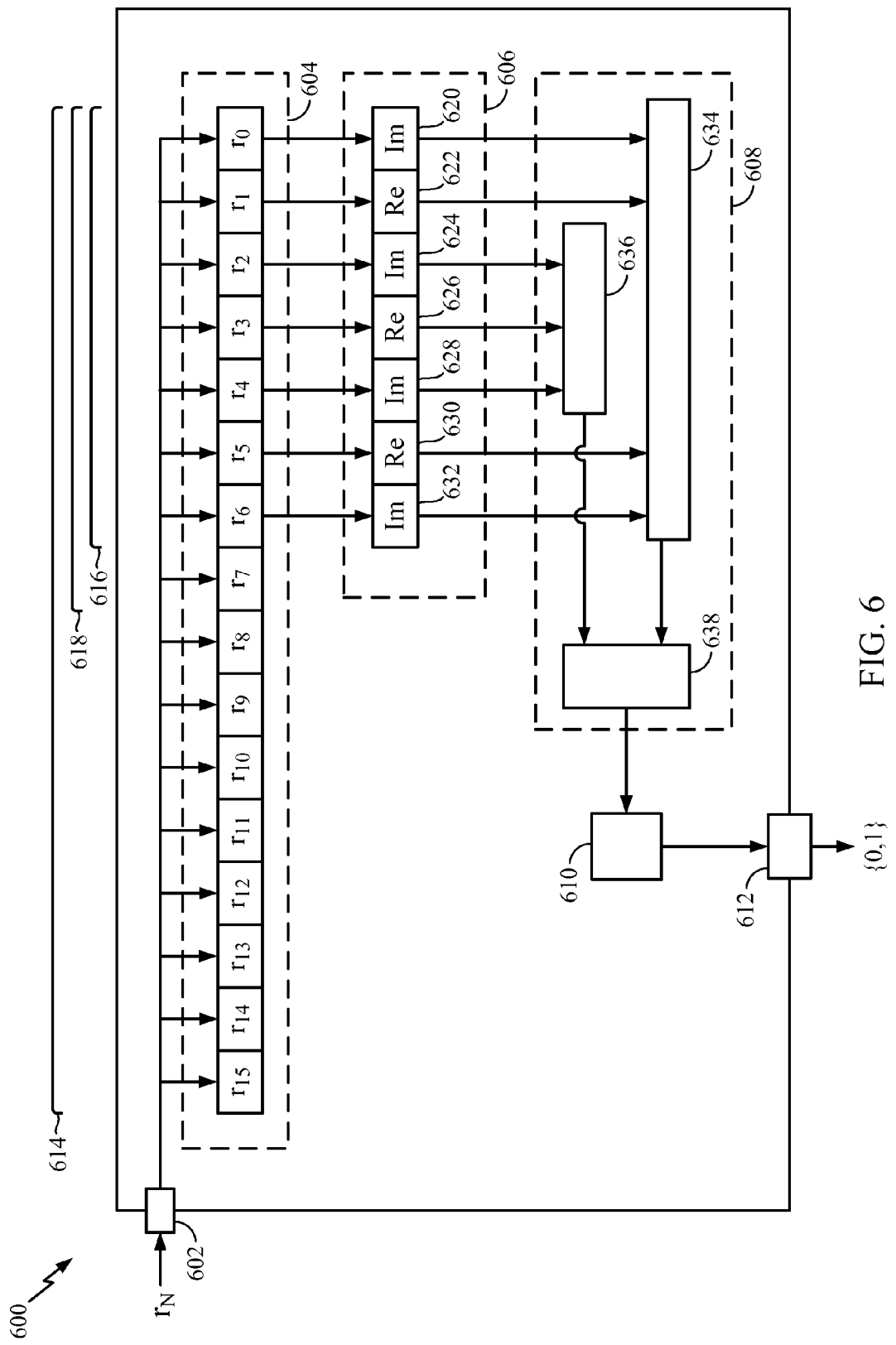
FIG. 6 is a block diagram of a joint demodulator and demapper for a digital signal according to an implementation.

FIG. 6 is a block diagram of a joint demodulator and demapper 600 for a digital signal according to an implementation. The joint demodulator and demapper 600 can include an input port 602, a memory 604, a first circuit 606, a second circuit 608, a third circuit 610, and an output port 612.

The input port 602 can be configured to receive a first sequence 614 of the digital signal (r). The digital signal can be a Gaussian Frequency Shift Keying modulated signal. The digital signal can be configured to meet specifications of Bluetooth® Core. The first sequence can have a first length equal to a modulation efficiency (N). For example, as illustrated in FIG. 6, the first sequence 614 has the first length equal to the modulation efficiency (N) of 16. The first sequence can have a pattern $(p_i)$ in which a norm of an ideal transmitted sequence of symbols for zero $(S_0)$ is equal to a norm of an ideal transmitted sequence of symbols for one $(S_1)$. The pattern $(p_i)$ can be a second sequence having a second length. The first length can be a multiple of the second length.

The memory 604 can be configured to store the first sequence 614. The memory 604 can be the buffer 408. Alternatively, the memory 604 and the buffer 408 can be separate components.

The first circuit 606 can be configured to determine, for each element of a set 616, one of a real part of a value of the element or an imaginary part of the value of the element. The set can be at least a portion of a third sequence 618. The third sequence 618 can be a portion of the first sequence 614. The third sequence 618 can have the second length. For example, as described above and as illustrated in FIG. 6, the third sequence 618 has the second length of 8 equal to the length of the second sequence of the pattern $(p_i)$ such that the first length of 16 is a multiple of the second length of 8.

The second circuit 608 can be configured to calculate a value for a combination of the one of the real part of the value or the imaginary part of the value determined for the each element of the set 616.

The third circuit 610 can be configured to set a bit equal to one in response to the value for the combination being less than zero and to set the bit equal to zero in response to the value for the combination being equal to or greater than zero.

The output port 612 can be configured to transmit the bit, for example, in the received bit stream {0, 1}.

One of skill in the art understands that the joint demodulator and demapper 600 can be realized using different configurations and that implementations are not limited to the joint demodulator and demapper 600 illustrated in FIG. 6.

As described above, the second length can be 8. The set 616 can include each of first $(r_0)$ through seventh $(r_6)$ elements of the first sequence 616. The first circuit 606 can include a fourth circuit 620 configured to determine the imaginary part of the value for the first element $(r_0)$, a fifth circuit 622 configured to determine the real part of the value for the second element $(r_1)$, a sixth circuit 624 configured to determine the imaginary part of the value for the third element $(r_2)$, a seventh circuit 626 configured to determine the real part of the value for the fourth element $(r_3)$, an eighth circuit 628 configured to determine the imaginary part of the value for the fifth element $(r_4)$, a ninth circuit 630 configured to determine the real part of the value for the sixth element $(r_5)$, and a tenth circuit 632 configured to determine the imaginary part of the value for the seventh element $(r_6)$.

One of skill in the art understands that other circuits can be used to determine, for each element of the set, one of the real value of the element or an imaginary value of the element as performed by the first circuit 606 of the joint demodulator and demapper 600 and that implementations are not limited to use of the fourth circuit 620, the fifth circuit 622, the sixth circuit 624, the seventh circuit 626, the eighth circuit 628, the ninth circuit 630, and the tenth circuit 632.

The second circuit 608 can include an eleventh circuit 634, a twelfth circuit 636, and a thirteenth circuit 638. The eleventh circuit 634 can be configured to produce a first sum equal to the imaginary part of the value for the first element $(r_o)$ added to the real part of the value for the second element $(r_1)$ added to the real part of the value for the sixth element $(r_5)$ added to the imaginary part of the value for the seventh element $(r_6)$. The twelfth circuit 636 can be configured to produce a second sum equal to the imaginary part of the value for the third element $(r_2)$ added to the real part of the value for the fourth element $(r_3)$ added to the imaginary part of the value for the fifth element $(r_4)$. The thirteenth circuit 638 can be configured to produce a difference equal to the first sum subtracted from the second sum.

One of skill in the art understands that other circuits can be used to calculate the value for the combination of the one of the real value or the imaginary value determined for the each element of the set 616 as performed by the second circuit 608 of the joint demodulator and demapper 600 and that implementations are not limited to use of the eleventh circuit 634, the twelfth circuit 636, and the thirteenth circuit 638.

Advantageously, the first circuit 606 and the second circuit 608 of the joint demodulator and demapper 600 can be configured to consume less power than a demodulator and a demapper configured to calculate a first Euclidean distance between each element of the first sequence and each element of the ideal transmitted sequence of symbols for zero $(S_0)$ and a second Euclidean distance between the each element of the first sequence and each element of the ideal transmitted sequence of symbols for one $(S_1)$.

Advantageously, the first circuit 606 and the second circuit 608 of the joint demodulator and demapper 600 can be configured to occupy less area than a demodulator and a demapper configured to calculate a first Euclidean distance between each element of the first sequence and each element of the ideal transmitted sequence of symbols for zero $(S_0)$ and a second Euclidean distance between the each element of the first sequence and each element of the ideal transmitted sequence of symbols for one $(S_1)$.

Figure 7:
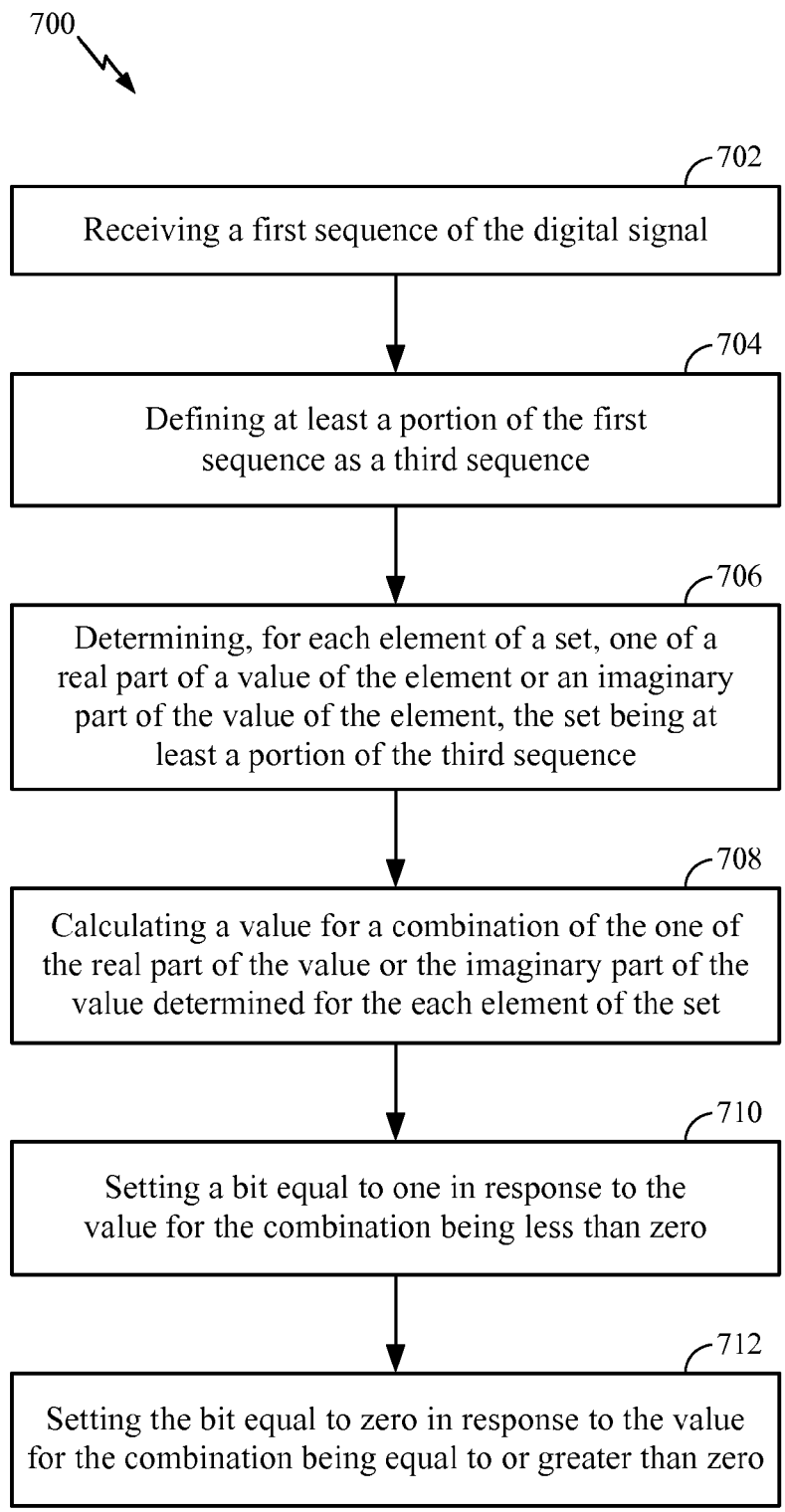
FIG. 7 is a flow chart of a method of joint demodulating and demapping of a digital signal according to an implementation.

FIG. 7 is a flow chart of a method 700 of joint demodulating and demapping of a digital signal according to an implementation. In method 700, at an operation 702, a first sequence of the digital signal (r) can be received. The digital signal can be a Gaussian Frequency Shift Keying modulated signal. The digital signal can be configured to meet specifications of Bluetooth® Core Version 4.0, Bluetooth® Core Version 4.1, or both. The first sequence can have a first length equal to a modulation efficiency (N). The first sequence can have a pattern $(p_i)$ in which a norm of an ideal transmitted sequence of symbols for zero $(S_0)$ is equal to a norm of an ideal transmitted sequence of symbols for one $(S_1)$. The pattern $(p_i)$ can be a second sequence that has a second length. The first length can be a multiple of the second length.

At an operation 704, a portion of the first sequence can be defined a third sequence. The third sequence can have the second length.

At an operation 706, for each element of a set, one of a real part of a value of the element or an imaginary part of the value of the element can be determined. The set can be at least a portion of the third sequence. The determining, for the each element of the set, can be based on a difference of a corresponding element of the ideal transmitted sequence of symbols for one $(S_1)$ subtracted from a corresponding element of the ideal transmitted sequence of symbols for zero $(S_0)$. The second length can be eight and the set can include each of first $(r_0)$ through seventh $(r_6)$ elements of the first sequence. Advantageously, the determining, for the each element of the set, can be performed in less time than a method that calculates a first Euclidean distance between each element of the first sequence and each element of the ideal transmitted sequence of symbols for zero $(S_0)$ and a second Euclidean distance between the each element of the first sequence and each element of the ideal transmitted sequence of symbols for one $(S_1)$.

At an operation 708, a value for a combination of the one of the real part of the value or the imaginary part of the value determined for the each element of the set can be calculated.

At an operation 710, a bit can be set equal to one in response to the value for the combination being less than zero.

At an operation 712, the bit can be set equal to zero in response to the value for the combination being equal to or greater than zero.

One of skill in the art understands that other methods can be used to joint demodulate and demap a digital signal and that implementations are not limited to the method 700 illustrated in FIG. 7.

Figure 8:
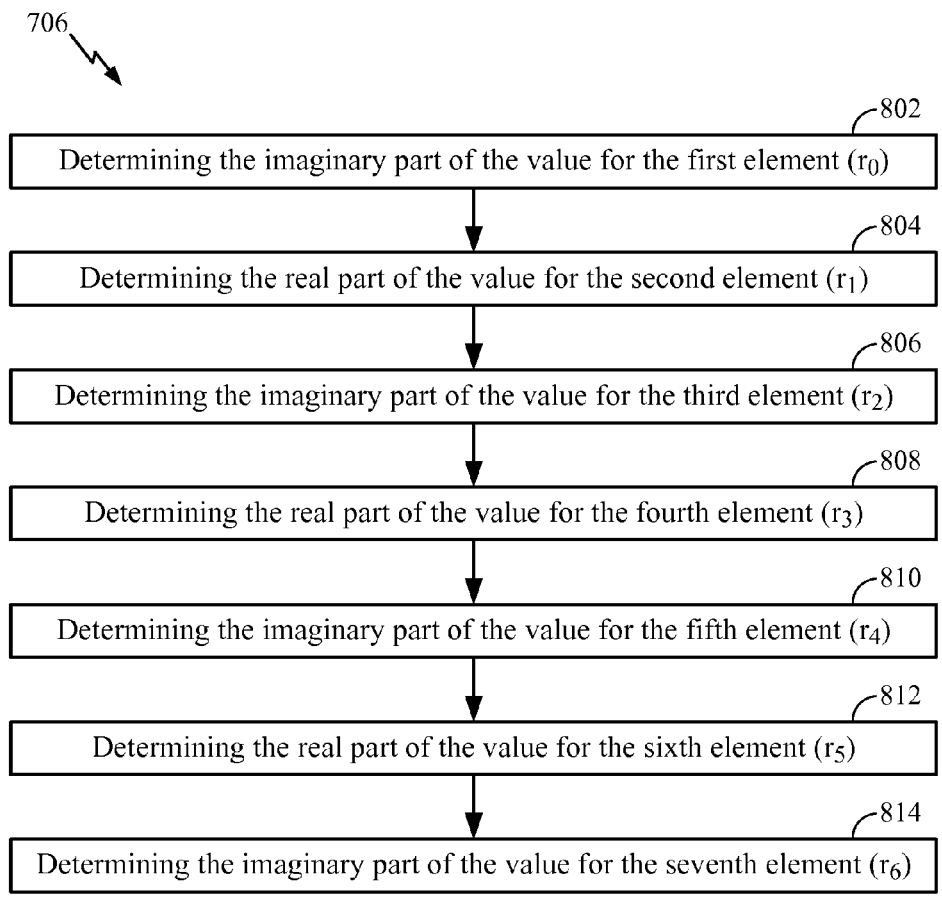
FIG. 8 is a flow chart of an example of a method to determine, for each element of a set, one of a real value of the element or an imaginary value of the element as included in the method illustrated in FIG. 7.

FIG. 8 is a flow chart of an example of a method 706 to determine, for each element of the set, one of the real part of the value of the element or the imaginary part of the value of the element as included in the method 700 illustrated in FIG. 7. In method 707, at an operation 802, the imaginary part of the value for the first element ($r_0$) can be determined. At an operation 804, the real part of the value for the second element ($r_1$) can be determined. At an operation 806, the imaginary part of the value for the third element ($r_2$) can be determined. At an operation 808, the real part of the value for the fourth element ($r_3$) can be determined. At an operation 810, the imaginary part of the value for the fifth element ($r_4$) can be determined. At an operation 812, the real part of the value for the sixth element ($r_5$) can be determined. At an operation 814, the imaginary part of the value for the seventh element ($r_6$) can be determined.

One of skill in the art understands that other methods can be used to determine, for each element of the set, one of the real value of the element or an imaginary value of the element as included in the method 700 illustrated in FIG. 7 and that implementations are not limited to the method 706 illustrated in FIG. 8.

Figure 9:
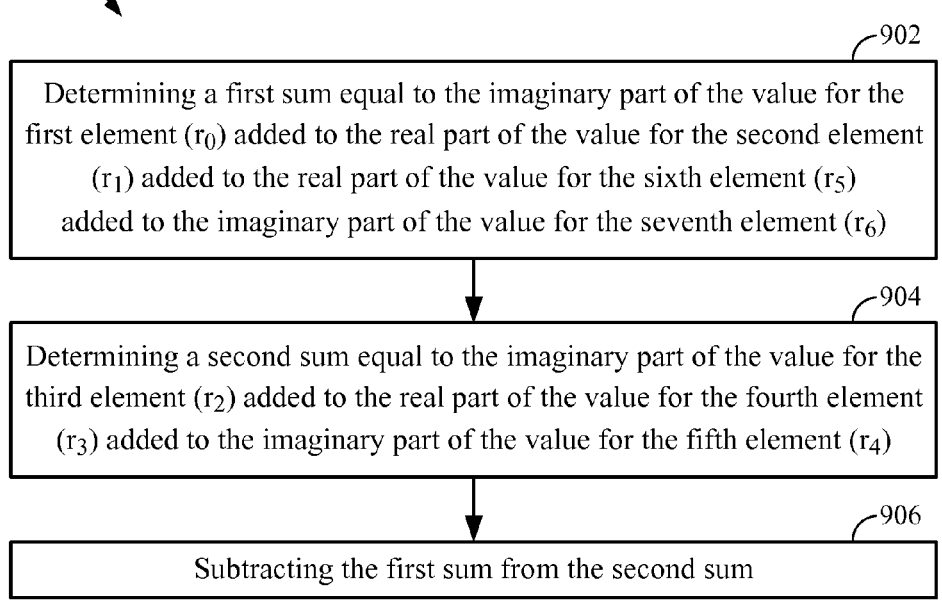
FIG. 9 is a flow chart of an example of a method to calculate a value for a combination of the one of the real value or the imaginary value determined for the each element of the set as included in the method illustrated in FIG. 7.

FIG. 9 is a flow chart of an example of a method 708 to calculate the value for the combination of the one of the real part of the value or the imaginary part of the value determined for the each element of the set as included in the method 700 illustrated in FIG. 7. In method 708, at an operation 902, a first sum can be determined to be equal to the imaginary part of the value for the first element ($r_0$) added to the real part of the value for the second element ($r_1$) added to the real part of the value for the sixth element ($r_5$) added to the imaginary part of the value for the seventh element ($r_6$).

At an operation 904, a second sum can be determined to be equal to the imaginary part of the value for the third element ($r_2$) added to the real part of the value for the fourth element ($r_3$) added to the imaginary part of the value for the fifth element ($r_4$).

At an operation 906, the first sum can be subtracted from the second sum.

One of skill in the art understands that other methods can be used to calculate the value for the combination of the one of the real value or the imaginary value determined for the each element of the set as included in the method 700 illustrated in FIG. 7 and that implementations are not limited to the method 708 illustrated in FIG. 9.

Figure 10:
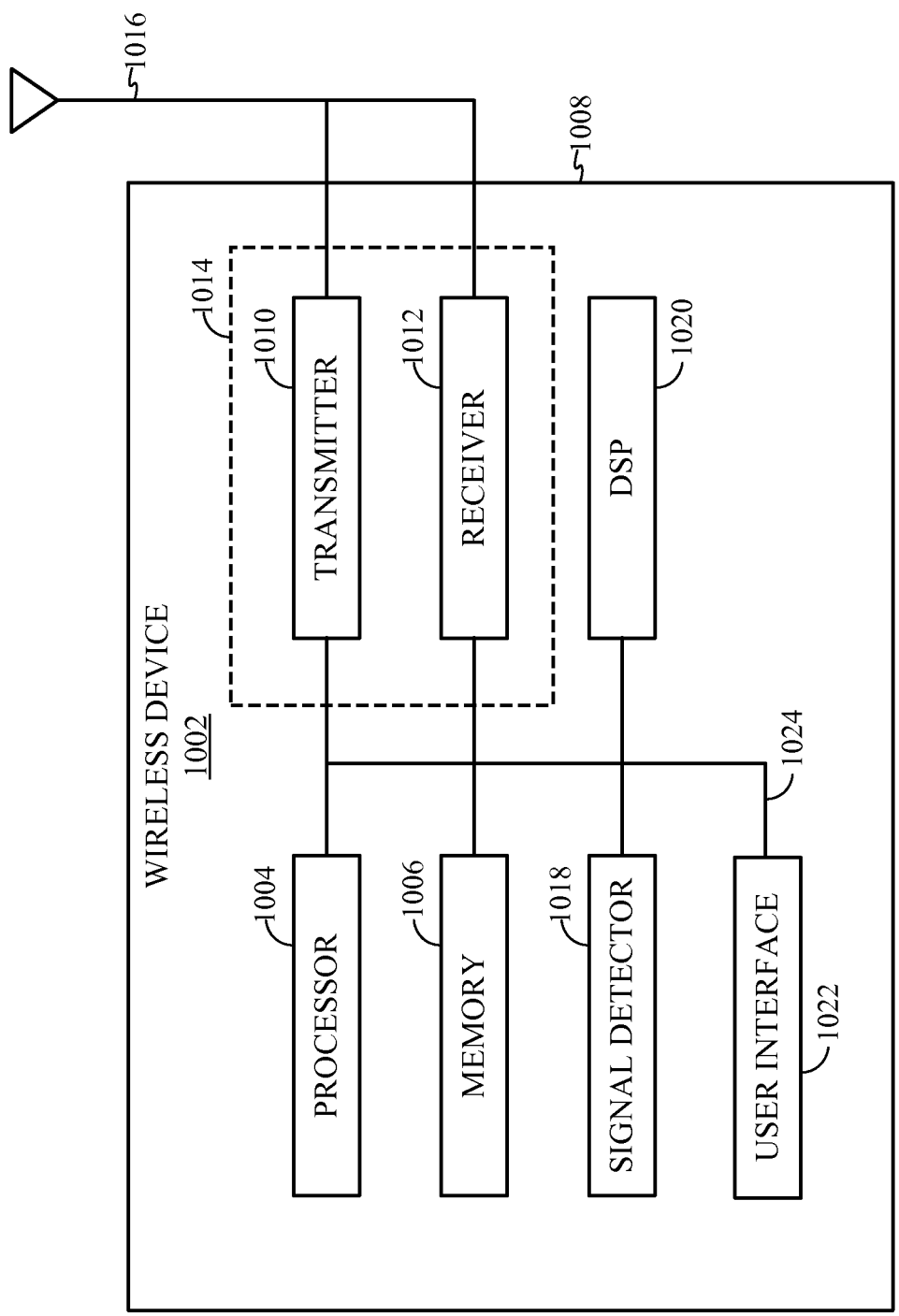
FIG. 10 is a block diagram of an example of a wireless device into which aspects disclosed herein can be incorporated.

FIG. 10 is a block diagram of an example of a wireless device 1002 into which aspects disclosed herein can be incorporated. The wireless device 1002 can include a processor 1004, a memory 1006, a housing 1008, a transmitter 1010, a receiver 1012, an antenna 1016, a signal detector 1018, a digital signal processor (DSP) 1020, a user interface 1022, and a bus 1024. Alternatively, the functions of the transmitter 1010 and the receiver 1012 can be incorporated into a transceiver 1014. The wireless device 1002 can be configured to communicate in a wireless network that includes, for example, a base station (not illustrated), an access point (not illustrated), and the like.

The processor 1004 can be configured to control operations of the wireless device 1002. The processor 1004 can also be referred to as a central processing unit (CPU). The memory 1006 can be coupled to the processor 1004, can be in communication with the processor 1004, and can provide instructions and data to the processor 1004. The processor 1004 can perform logical and arithmetic operations based on program instructions stored within the memory 1006. The instructions in the memory 1006 can be executable to perform one or more of the methods and processes described herein.

The processor 1004 can include, or be a component of, a processing system implemented with one or more processors. The one or more processors can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations and/or manipulate information.

The processing system can also include machine-readable media for storing software. Software can be construed broadly to mean any type of instructions, whether referred to as software, firmware, middleware, microcode, hardware description language, or otherwise. Instructions can include code, e.g., in source code format, binary code format, executable code format, or any other suitable format of code. The instructions, when executed by the one or more processors, can cause the processing system to perform one or more of the functions described herein.

The memory 1006 can include both read-only memory (ROM) and random access memory (RAM). A portion of the memory 1006 can also include non-volatile random access memory (NVRAM).

The transmitter 1010 and the receiver 1012 (or the transceiver 1014) can allow transmission and reception of data between the wireless device 1002 and a remote location. The antenna 1016 can be attached to the housing 1008 and electrically coupled to the transceiver 1014. In some implementations, the wireless device 1002 can also include multiple transmitters, multiple receivers, multiple transceivers, and/or multiple antennas (not illustrated).

The signal detector 1018 can be used to detect and quantify the level of signals received by the transceiver 1014. The signal detector 1018 can detect such signals as total energy, energy per subcarrier per symbol, and/or power spectral density and in other ways.

The digital signal processor (DSP) 1020 can be used to process signals. The DSP 220 can be configured to generate a packet for transmission. In some aspects, the packet can include a physical layer data unit (PPDU).

The user interface 1022 can include, for example, a keypad, a microphone, a speaker, and/or a display. The user interface 1022 can include any element or component that conveys information to a user of the wireless device 1002 and/or receives input from a user.

The various components of the wireless device 1002 can be coupled together by a bus system 1024. The bus system 1024 can include a data bus, and can also include a power bus, a control signal bus, and/or a status signal bus in addition to the data bus.

The wireless device 1002 can also include other components or elements not illustrated in FIG. 10. One or more of the components of the wireless device 1002 can be in communication with another one or more components of the wireless device 1002 by means of another communication channel (not illustrated) to provide, for example, an input signal to the other component.

Although a number of separate components are illustrated in FIG. 10, one or more of the components can be combined or commonly implemented. For example, the processor 1004 and the memory 1006 can be embodied on a single chip. The processor 1004 can additionally, or in the alternative, contain memory, such as processor registers. Similarly, one or more of the functional blocks or portions of the functionality of various blocks can be embodied on a single chip. Alternatively, the functionality of a particular block can be implemented on two or more chips. For example, the processor 1004 can be used to implement not only the functionality described above with respect to the processor 1004, but also to implement the functionality described above with respect to the signal detector 1018 and/or the DSP 1020.

Those of skill in the art appreciate that information and signals can be represented using any of a variety of different technologies and techniques. For example, data, instructions, commands, information, signals, bits, symbols, and chips that may be referenced throughout the above description can be represented by voltages, currents, electromagnetic waves, magnetic fields or particles, optical fields or particles, or any combination thereof.

Further, those of skill in the art appreciate that the various illustrative logical blocks, modules, circuits, and algorithm steps described in connection with the implementations disclosed herein can be realized as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans can implement the described functionality in varying ways for each particular application, but such implementation decisions should not be interpreted as causing a departure from the scope of the aspects disclosed herein.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the implementations disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

In one or more exemplary implementations, the functions described can be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above can also be included within the scope of computer-readable media.

While the foregoing disclosure shows illustrative implementations, it is noted that various changes and modifications can be made herein without departing from the scope of the aspects disclosed herein as defined by the appended claims. The functions, steps and/or actions of the method claims in accordance with the implementations described herein need not be performed in any particular order. Furthermore, although elements of the aspects can be described or claimed in the singular, the plural is contemplated unless limitation to the singular is explicitly stated.

What is clamed is:

1. A method of joint demodulating and demapping of a digital signal, comprising:

receiving a first sequence of the digital signal (r) at a joint demodulator and demapper, the digital signal (r) being a complex representation of a modulated wireless waveform, the first sequence having a first length equal to a modulation efficiency (N), the first sequence having a pattern ($p_i$) in which a norm of an ideal transmitted sequence of symbols for zero ($S_0$) is equal to a norm of an ideal transmitted sequence of symbols for one ($S_1$), the pattern ($p_i$) being based on a second sequence having a second length, and the first length being a multiple of the second length;

defining at least a portion of the first sequence as a third sequence, the third sequence having the second length;

determining, for each element of a set, one of a real part of a value of the element or an imaginary part of the value of the element, the set being at least a portion of the third sequence;

calculating a value for a combination of the one of the real part of the value or the imaginary part of the value determined for the each element of the set;

setting a bit equal to one in response to the value for the combination being less than zero; and setting the bit equal to zero in response to the value of the combination being equal to or greater than zero, the bit representing a demodulated and demapped bit.

2. The method of claim 1, wherein the determining, for the each element of the set, is based on a difference of a corresponding element of the ideal transmitted sequence of symbols for one ($S_1$) subtracted from a corresponding element of the ideal transmitted sequence of symbols for zero ($S_0$).

3. The method of claim 2, wherein the second length is eight and the set includes each of first ($r_0$) through seventh ($r_6$) elements of the first sequence.

4. The method of claim 3, wherein the first length is one of 16, 24, or 32.

5. The method of claim 3, wherein the determining, for the each element of the set, comprises
   determining the imaginary part of the value for the first element ($r_0$),
   determining the real part of the value for the second element ($r_1$),
   determining the imaginary part of the value for the third element ($r_2$),
   determining the real part of the value for the fourth element ($r_3$),
   determining the imaginary part of the value for the fifth element ($r_4$),
   determining the real part of the value for the sixth element ($r_5$), and
   determining the imaginary part of the value for the seventh element ($r_6$).

6. The method of claim 5, wherein the calculating comprises subtracting a first sum from a second sum, the first sum being equal to the imaginary part of the value for the first element ($r_0$) added to the real part of the value for the second element ($r_1$) added to the real part of the value for the sixth element ($r_5$) added to the imaginary part of the value for the seventh element ($r_6$), and the second sum being equal to the imaginary part of the value for the third element ($r_2$) added to the real part of the value for the fourth element ($r_3$) added to the imaginary part of the value for the fifth element ($r_4$).

7. The method of claim 1, wherein the digital signal comprises a Gaussian Frequency Shift Keying modulated signal.

8. The method of claim 1, wherein the digital signal is configured to meet specifications of Bluetooth® Core.

9. The method of claim 1, wherein the determining, for the each element of the set, is performed in less time than a method that calculates a first Euclidean distance between each element of the first sequence and each element of the ideal transmitted sequence of symbols for zero ($S_0$) and a second Euclidean distance between the each element of the first sequence and each element of the ideal transmitted sequence of symbols for one ($S_1$).

10. A joint demodulator and demapper for a digital signal, comprising:
    an input port configured to receive a first sequence of the digital signal (r), the digital signal (r) being a complex representation of a modulated wireless waveform, the first sequence having a first length equal to a modulation efficiency (N), the first sequence having a pattern ($p_i$) in which a norm of an ideal transmitted sequence of symbols for zero ($S_0$) is equal to a norm of an ideal transmitted sequence of symbols for one ($S_1$), the pattern ($p_i$) being based on a second sequence having a second length, and the first length being a multiple of the second length;
    a memory configured to store the first sequence;
    a first circuit configured to determine, for each element of a set, one of a real part of a value of the element or an imaginary part of the value of the element, the set being at least a portion of a third sequence, the third sequence being at least a portion of the first sequence, and the third sequence having the second length;
    a second circuit configured to calculate a value for a combination of the one of the real part of the value or the imaginary part of the value determined for the each element of the set;
    a third circuit configured to set a bit equal to one in response to the value for the combination being less than zero and to set the bit equal to zero in response to the value for the combination being equal to or greater than zero; and
    an output port configured to transmit the bit representing a demodulated and demapped bit.

11. The joint demodulator and demapper of claim 10, wherein the second length is eight, the set includes each of first ($r_0$) through seventh ($r_6$) elements of the first sequence, and the first circuit comprises:
    a fourth circuit configured to determine the imaginary part of the value for the first element ($r_0$);
    a fifth circuit configured to determine the real part of the value for the second element ($r_1$);
    a sixth circuit configured to determine the imaginary part of the value for the third element ($r_2$);
    a seventh circuit configured to determine the real part of the value for the fourth element ($r_3$);
    an eighth circuit configured to determine the imaginary part of the value for the fifth element ($r_4$);
    a ninth circuit configured to determine the real part of the value for the sixth element ($r_5$); and
    a tenth circuit configured to determine the imaginary part of the value for the seventh element ($r_6$).

12. The joint demodulator and demapper of claim 11, wherein the second circuit comprises:
    an eleventh circuit configured to produce a first sum equal to the imaginary part of the value for the first element ($r_0$) added to the real part of the value for the second element ($r_1$) added to the real part of the value for the sixth element ($r_5$) added to the imaginary part of the value for the seventh element ($r_6$);
    a twelfth circuit configured to produce a second sum equal to the imaginary part of the value for the third element ($r_2$) added to the real part of the value for the fourth element ($r_3$) added to the imaginary part of the value for the fifth element ($r_4$); and
    a thirteenth circuit configured to produce a difference equal to the first sum subtracted from the second sum.

13. The joint demodulator and demapper of claim 10, wherein the digital signal comprises a Gaussian Frequency Shift Keying modulated signal.

14. The joint demodulator and demapper of claim 10, wherein the digital signal is configured to meet specifications of Bluetooth® Core.

15. The joint demodulator and demapper of claim 10, wherein the first circuit and the second circuit are configured to consume less power than a demodulator and a demapper configured to calculate a first Euclidean distance between each element of the first sequence and each element of the ideal transmitted sequence of symbols for zero ($S_0$) and a second Euclidean distance between the each element of the first sequence and each element of the ideal transmitted sequence of symbols for one ($S_1$).

16. The demodulator and demapper of claim 10, wherein the first circuit and the second circuit are configured to occupy less area than a demodulator and a demapper configured to calculate a first Euclidean distance between each element of the first sequence and each element of the ideal transmitted sequence of symbols for zero ($S_0$) and a second Euclidean distance between the each element of the first sequence and each element of the ideal transmitted sequence of symbols for one ($S_1$).

17. A joint demodulator and demapper for a digital signal, comprising:
    means for receiving a first sequence of the digital signal (r), the digital signal (r) being a complex representation of a modulated wireless waveform, the first sequence having a first length equal to a modulation efficiency (N), the first sequence having a pattern ($p_i$) in which a norm of an ideal transmitted sequence of symbols for zero ($S_0$) is equal to a norm of an ideal transmitted sequence of symbols for one ($S_1$), the pattern ($p_i$) being based on a second sequence having a second length, and the first length being a multiple of the second length;

means for defining at least a portion of the first sequence as a third sequence, the third sequence having the second length;

means for determining, for each element of a set, one of a real part of a value of the element or an imaginary part of the value of the element, the set being at least a portion of the third sequence;

means for calculating a value for a combination of the one of the real part of the value or the imaginary part of the value determined for the each element of the set;

means for setting a bit equal to one in response to the value for the combination being less than zero; and means for setting the bit equal to zero in response to the value for the combination being equal to or greater than zero, the bit representing a demodulated and demapped bit.

18. The joint demodulator and demapper of claim 17, wherein the means for determining is configured to make a determination based on a difference of a corresponding element of the ideal transmitted sequence of symbols for one ($S_1$) subtracted from a corresponding element of the ideal transmitted sequence of symbols for zero ($S_0$).

19. The joint demodulator and demapper of claim 18, wherein the second length is eight and the set includes each of first ($r_0$) through seventh ($r_6$) elements of the first sequence.

20. The joint demodulator and demapper of claim 19, wherein the first length is one of 16, 24, or 32.

21. The joint demodulator and demapper of claim 19, wherein the means for determining is configured to determine the imaginary part of the value for the first element ($r_0$), to determine the real part of the value for the second element ($r_1$), to determine the imaginary part of the value for the third element ($r_2$), to determine the real part of the value for the fourth element ($r_3$), to determine the imaginary part of the value for the fifth element ($r_4$), to determine the real part of the value for the sixth element ($r_5$), and to determine the imaginary part of the value for the seventh element ($r_6$).

22. The joint demodulator and demapper of claim 21, wherein the means for calculating is configured to subtract a first sum from a second sum, the first sum being equal to the imaginary part of the value for the first element ($r_0$) added to the real part of the value for the second element ($r_1$) added to the real part of the value for the sixth element ($r_5$) added to the imaginary part of the value for the seventh element ($r_6$), and the second sum being equal to the imaginary part of the value for the third element ($r_2$) added to the real part of the value for the fourth element ($r_3$) added to the imaginary part of the value for the fifth element ($r_4$).

23. The joint demodulator and demapper of claim 17, wherein the digital signal comprises a Gaussian Frequency Shift Keying modulated signal.

24. The joint demodulator and demapper of claim 17, wherein the digital signal is configured to meet specifications of Bluetooth® Core.

25. A non-transitory computer-readable recording medium for joint demodulating and demapping of a digital signal, comprising:

at least one instruction to cause an electronic processor to receive a first sequence of the digital signal (r), the digital signal (r) being a complex representation of a modulated wireless waveform, the first sequence having a first length equal to a modulation efficiency (N), the first sequence having a pattern ($p_i$) in which a norm of an ideal transmitted sequence of symbols for zero ($S_0$) is equal to a norm of an ideal transmitted sequence of symbols for one ($S_1$), the pattern ($p_i$) being based on a second sequence having a second length, and the first length being a multiple of the second length;

at least one instruction to cause the electronic processor to define at least a portion of the first sequence as a third sequence, the third sequence having the second length;

at least one instruction to cause the electronic processor to determine, for each element of a set, one of a real part of a value of the element or an imaginary part of the value of the element, the set being at least a portion of the third sequence;

at least one instruction to cause the electronic processor to calculate a value for a combination of the one of the real part of the value or the imaginary part of the value determined for the each element of the set;

at least one instruction to cause the electronic processor to set a bit equal to one in response to the value for the combination being less than zero; and at least one instruction to cause the electronic processor to set the bit equal to zero in response to the value of the combination being equal to or greater than zero, the bit representing a demodulated and demapped bit.

26. The non-transitory computer-readable recording medium of claim 25, wherein the at least one instruction to cause the electronic processor to determine comprises at least one instruction to cause the electronic processor to make a determination based on a difference of a corresponding element of the ideal transmitted sequence of symbols for one ($S_1$) subtracted from a corresponding element of the ideal transmitted sequence of symbols for zero ($S_0$).

27. The non-transitory computer-readable recording medium of claim 26, the second length is eight and the set includes each of first ($r_0$) through seventh ($r_6$) elements of the first sequence.

28. The non-transitory computer-readable recording medium of claim 27, wherein the first length is one of 16, 24, or 32.

29. The non-transitory computer-readable recording medium of claim 27, wherein the at least one instruction to cause the electronic processor to determine comprises at least one instruction to cause the electronic processor to determine the imaginary part of the value for the first element ($r_0$), to determine the real part of the value for the second element ($r_1$), to determine the imaginary part of the value for the third element ($r_2$), to determine the real part of the value for the fourth element ($r_3$), to determine the imaginary part of the value for the fifth element ($r_4$), to determine the real part of the value for the sixth element ($r_5$), and to determine the imaginary part of the value for the seventh element ($r_6$).

30. The non-transitory computer-readable recording medium of claim 29, wherein the at least one instruction to cause the electronic processor to calculate comprises at least one instruction to cause the electronic processor to subtract a first sum from a second sum, the first sum being equal to the imaginary part of the value for the first element ($r_0$) added to the real part of the value for the second element ($r_1$) added to the real part of the value for the sixth element ($r_5$) added to the imaginary part of the value for the seventh element ($r_6$), and the second sum being equal to the imaginary part of the value for the third element ($r_2$) added to the real part of the value for the fourth element ($r_3$) added to the imaginary part of the value for the fifth element ($r_4$).

* * * * *